Sept. 28, 1965  A. D. STRUBLE, JR  3,209,155
GENERATOR HAVING AN AXIALLY MOVABLE ARMATURE
TO PREVENT MAGNETIC CLOGGING
Filed March 29, 1963  4 Sheets-Sheet 1
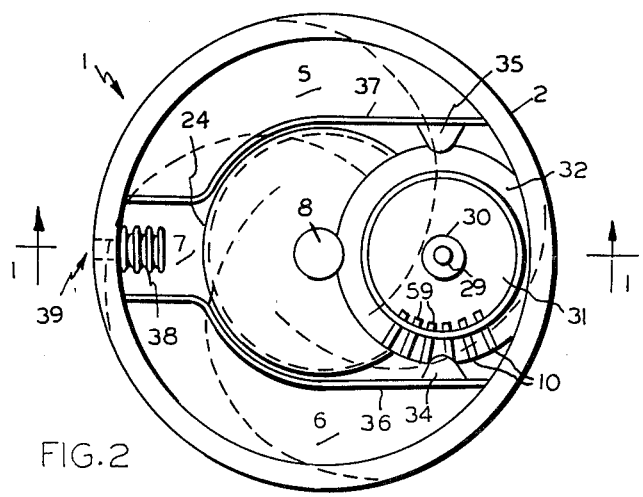
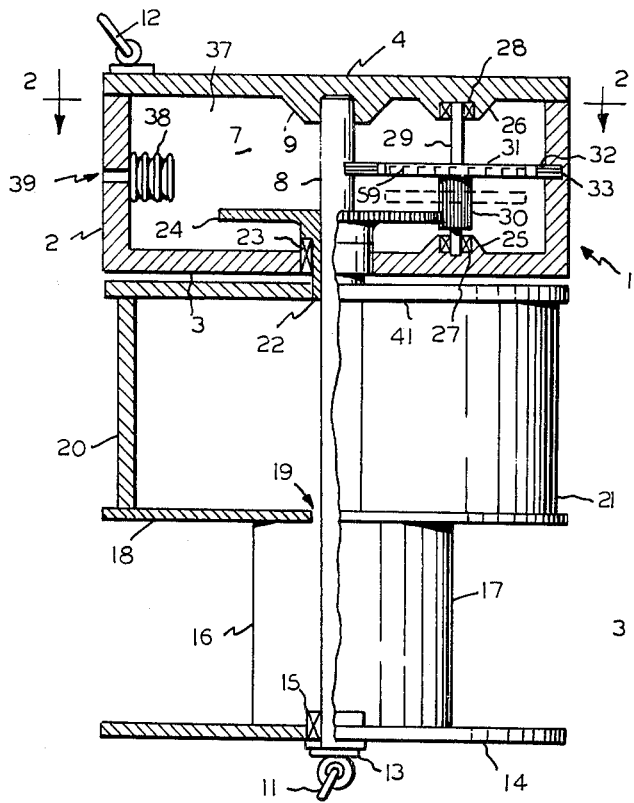
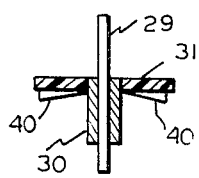
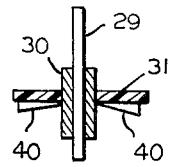
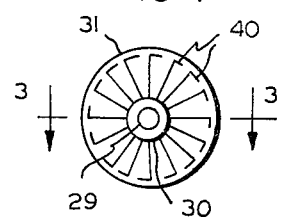

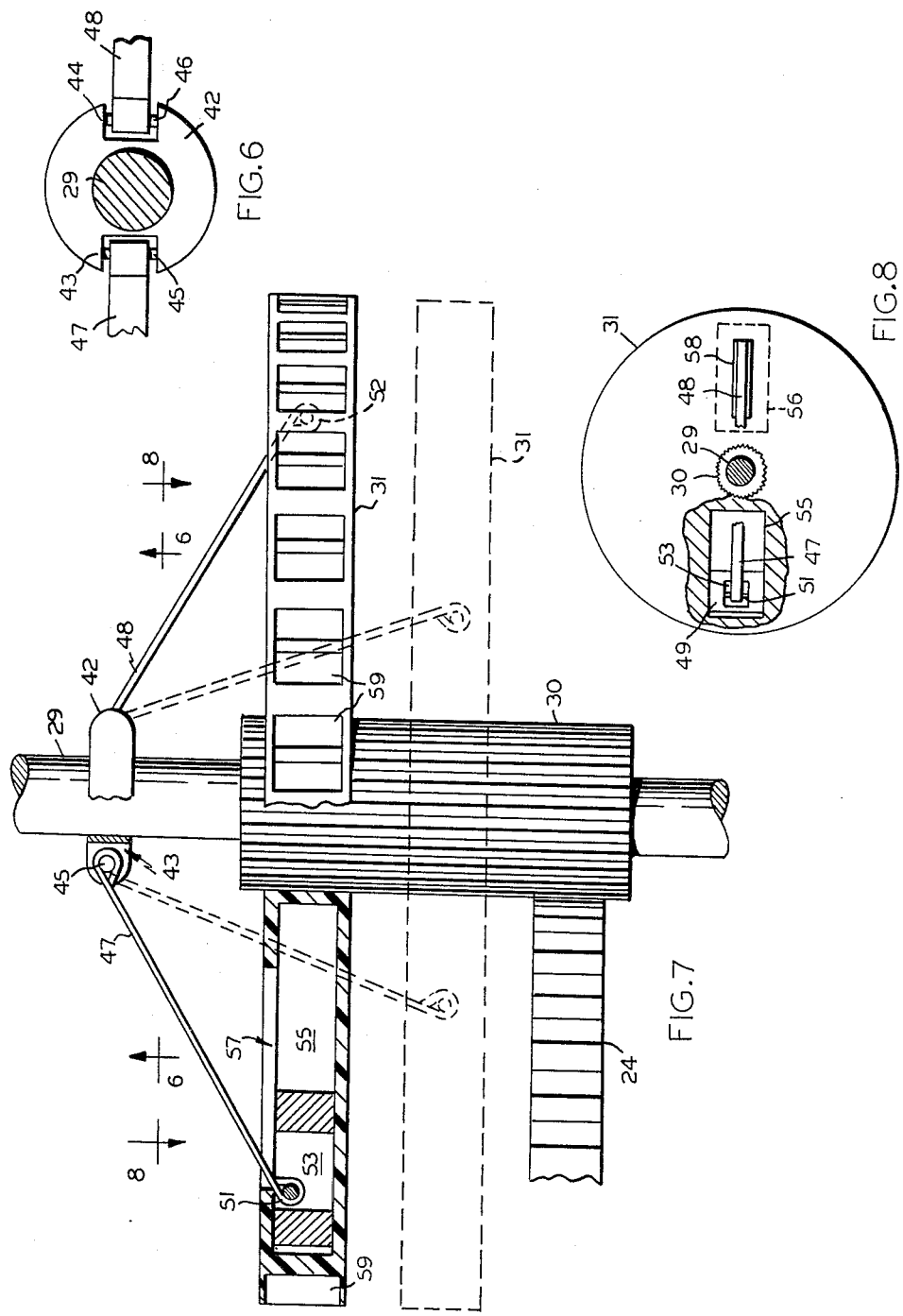

United States Patent Office 3,209,155
Patented Sept. 28, 1965

3,209,155
GENERATOR HAVING AN AXIALLY MOVABLE ARMATURE TO PREVENT MAGNETIC CLOGGING
Arthur D. Struble, Jr., 2101 Rosita Place, Palos Verdes, Calif.
Filed Mar. 29, 1963, Ser. No. 268,954
7 Claims. (Cl. 290—54)

This invention relates to electric generators of the alternator type. Furthermore, the invention relates to electric generators driven by an impeller submerged in water. More particularly, the invention relates to submersible devices adapted to serve intermittently as electrical generators and as water current velocity detectors.

There are various kinds of alternator type generators, sometimes referred to merely as "alterators." A common type of alternator involves a rotor carrying a plurality of magnets arranged side-to-side about its periphery with their poles facing radially outward. The rotor is mounted rotatively within a ring-shaped stator having an inner diameter slightly larger than the diameter of the rotor. About the inner surface of the stator are disposed pole shoes in vertically arranged stacks. The shoes are connected to pole pieces which extend radially outward therefrom into the body of the stator. These pole pieces are wound with bifilar windings which are electrically interconnected wtih one another. When the rotor is caused to rotate, current is generated in these windings.

The problem of "cogging" or the "cogging effect" has been experienced with alternator generators under some circumstances. When the rotor of an alternator comes to rest, the rotor magnets and the stacks of pole pieces in the stator tend to line up with one another in such a manner as to develop a strong magnetic attraction between them. In order to get the rotor started again, it is necessary not only to overcome the inertia of the rotor itself but also to overcome the aforesaid magnetic attraction. Thus, the cogging effect increases the amount of torque required to start the rotor.

"Cogging" also has an effect on an alternator when its rotor is turning very slowly. As the rotor turns, each of the magnets about its periphery sweeps past a series of sets of stacked pole pieces. As a given magnet approaches a given set of stacked pole shoes, the magnetic attraction between the pole shoes and the magnet exerts a rotational moment on the rotor in the same direction that it is turning. As the particular magnet rotates past and away from the aforesaid set of pole shoes, the magnetic attraction between them results in a rotational moment which is contrary to the direction in which the rotor is turning. These moments of alternating direction are superimposed upon the force which is driving the rotor, resulting in unevenness operation and tending to bring the rotor to a stop at very low rotational velocities.

The above described problem is of no consequence when the alternator is driven by a power supply having plenty of starting starting torque and capable of turning the alternator at a uniformly maintained high number of revolutions per minute. However, such power supplies are not available in all applications in which it is desirable to employ an alternator. For instance, when an alternator is powered by a rotary impeller submerged in water, the ultimate source of power is natural, sub-surface water currents which vary in velocity from time to time. In such applications, the cogging effect often amounts to a formidable problem.

An underwater generator containing an alternator may, at any given point, in the ocean, be subjected to current velocities ranging from a small fraction of a knot to several knots. It has been found difficult to design a sub-surface generator containing an alternator, which would develop large amounts of electrical power at low current velocities and still have sufficient starting torque to overcome the cogging effect.

The cogging effect is particularly acute in an alternator having equal numbers of magnets and sets of pole shoes equally spaced about the rotor and stator respectively. The problem can be relieved by providing a different number of magnets than there are pole shoe sets. However, in order to compensate for the inevitable electrical mismatch that results from the adoption of this expedient, it is necessary to electrically subdivide the windings. The amount of work and cost involved in making such a subdivision renders the alternator unduly complicated and expensive. Consequently, there remains a demand for a solution to the "cogging" problem.

With the growing importance of submarine detection, underwater communications and measurement of oceanographic phenomena, a need has arisen for practical devices which would make possible the dispersal of a large number of self-powered, unattended measuring and sensing units at mutually distant locations beneath the surface of the ocean or other bodies of water. One type of device which may be used for the above purposes includes a housing, a payload compartment within the housing, an alternator type generator within the housing, an impeller mounted outside the housing and power transmission means connecting the impeller and the alternator. The payload compartment may contain equipment for rectifying and governing the amplitude of the electrical output of the generator as well as transmitting, receiving and recording apparatus, measuring devices, and any kind of desired auxiliary equipment.

It has been found possible to construct units of the above described type in which the water current velocity conditions in the vicinity of the unit may be measured as a function of the velocity of the rotor in the alternator. An example of such a unit will be illustrated below. It has been found that the cogging effect constitutes a problem in such units since it interferes with the smooth operation of the alternator rotor when the current velocity, and therefore the rotational velocity of the rotor, are low. Consequently, there remains a need for solution of the cogging problem devices of this nature.

Accordingly, it is the principal object of the present invention to solve the above described problems. Specifically, it is an object of this invention to provide an alternator type generator which is free of cogging effects.

Still another object of this invention is to provide an alternator containing means for keeping the rotor of a stopped or slowly rotating alternator at a sufficient distance from the stator to practically eliminate cogging.

Still another object of this invention is to provide means for moving an alternator rotor from a starting position to a generating position whenever the rotor attains a pre-determined rotational velocity at which cogging effects are minimal.

Yet another object of this invention is to provide an alternator including means for shifting the rotor from generating position to another position in which it may act as part of a measuring device.

Still a further object of this invention is to provide an improved underwater generator which is capable of developing large quantities of electrical power at low water current velocities and in which the starting torque is virtually unaffected by the cogging effect.

A still further object of this invention is to provide underwater current generating apparatus provided with means for intermittently generating electricity and measuring water current velocity.

Another object of this invention is to provide an underwater generator containing an alternator in which the rotor serves the dual functions of inducing current in stator windings and, from time to time, inducing electrical current in a water current measuring coil.

Other objects will be apparent from the following description and accompanying drawings.

These objects are accomplished in accordance with this invention by an alternator which includes: a housing; a stator in said housing, including windings; a shaft journaled in the housing; a field magnet carrying rotor associated with the shaft; means for connecting the rotor to the shaft and for preventing relative rotational movement between them while permitting a degree of axial movement of the rotor along the shaft; said rotor having a generating position on said shaft in which said rotor is adjacent said stator for generation of current upon rotation of said shaft and a starting postion in which said rotor is axially displaced in a direction away from said stator and said generating position; means for shifting the rotor axially along the shaft from the starting position to the generating position whenever the shaft attains sufficient rotational velocity to overcome cogging effects.

In certain embodiments of the invention an alternator of the above described type will be utilized in an improved type of underwater generator, although the invention is not limited to use in underwater generators. In certain other embodiments of the invention the alternator will be provided with automatic means for periodically shifting the rotor shaft axially from its normal position. In still other particular embodiments of the invention the means for shifting the rotor may include a plurality of vanes associated with the rotor or a plurality of radially reciprocable fly-weights and hanger means associated with the rotor and shaft, while the means for shifting the shaft axially may include cooperating rotary cam members situated at one end of said shaft.

Several preferred embodiments of the invention will now be described with the aid of the accompanying drawings in which like reference numerals are used to refer to like parts throughout the several views and in which;

FIGURE 1 is a partly sectional view taken largely along section line 1—1 in FIGURE 2.

FIGURE 2 is a sectional view taken along section line 2—2 in FIGURE 1.

FIGURES 3 through 5 show modified forms of elements of FIGURE 1, FIGURE 3 being a sectional view taken along section line 3—3 in FIGURE 5, FIGURE 4 being similar to FIGURE 3 but showing some parts in alternate positions, and FIGURE 5 being a bottom view.

FIGURE 6 is a sectional view taken along section line 6—6 in FIGURE 7.

FIGURE 7 is an enlarged detail view of modified elements of FIGURE 1.

FIGURE 8 is a partial broken out sectional view taken along section line 8—8 in FIGURE 7.

Figure 9:
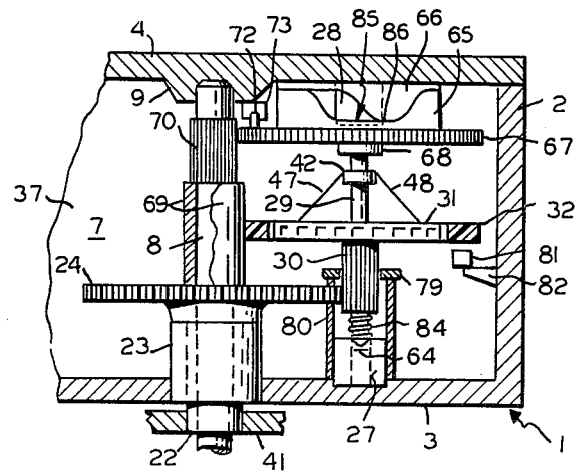
FIGURE 9 is a partial sectional view of certain modified elements of FIGURE 1.

A first embodiment of the invention is shown in FIGURES 1-5. The alternator is shown therein as part of an underwater generator having a housing 1, including a cylindrical side wall 2 closed off by an integral bottom wall 3 and by a removable, water-tight cover 4. The housing can be made of any material having sufficient strength for the job.

If metal is used, some form of cathodic protection will be needed. For that reason, certain types of plastic, such as polyester resin, are preferred materials. The plastic may be reinforced with fiberglass or its equivalent and may contain various amounts of inert fillers. By a judicious selection of the amount of filler added in relation to the weight of the entire housing and contents, it is possible to give the device a specific gravity lower than that of water, so that the unit may then serve as its own buoy, needing no auxiliary floatation equipment. Regardless of the material used, it is well to provide the housing with an anti-fouling preparation to inhibit marine growths.

A long, fixed shaft 8 is rooted in a boss 9, provided on the underside of cover 4 in generator compartment 7. The axis of the shaft and housing coincide. The shaft, which extends through the bottom wall 3 and well beyond, terminates in a ring assembly 11, adjacent which is a retainer assembly 13. The retainer assembly is provided for the purpose of supporting the lower end of a savonius impeller, somewhat similar to the one shown in U.S. Patent 1,709,100 to C. L. Tice. The comments made above with regard to the materials, specific gravity and coating of the housing also apply to the impeller.

The impeller includes lower and intermediate circular discs 14 and 18 respectively, between which are disposed lower impeller blades 16 and 17. A similar pair of upper impeller blades, 20 and 21, are disposed between intermediate disc 18 and upper disc 41, the upper blades each being mounted 180° apart from the other and 90° out of phase with each of the lower blades. At the centers of the various discs are aperatures to receive the shaft 8, such as aperture 19 in intermediate disc 18.

A bearing 15 is rigidly secured in the aperture provided in disc 14. This bearing encircles the lower end of shaft 8. The lower end of a driving sleeve 22 is fixed in the aperture provided in upper disc 41. This sleeve is concentric with the shaft 8, is free to rotate thereon and extends therewith through a leakproof bearing and seal assembly 23. When necessary, and this is frequently the case, some sort of leakproof packing must be provided between the shaft and the sleeve. This element has been eliminated from the drawing for the sake of clarity but will be readily supplied by the skilled artisan.

The device, as depicted and above described, is tethered beneath the surface of the water by an anchor and anchor line (not shown) connected to ring 13. Because of its positive buoyancy with respect to water, the unit floats upwards to the maximum extent permitted by the length of the line and the velocity of the current, the length of the anchor line being less than the depth of the water, preferably considerably less. In order to stabilize the housing against yawing and rotation in the current, any suitable kind of stabilizing means, such as a light line connected to a sea anchor or small surface buoy, may be secured to ring assembly 12 at one side of the cover 4. Vertical stabilization is attained, in part, by insuring that the housing and contents have a lower specific gravity than the average specific gravity of the impeller and of so much of the shaft 8 as extends outside the housing. A device made and submerged in the manner described will "float" beneath the surface in a generally upright attitude, the impeller rotating about the fixed shaft 8 under the influence of sub-surface water currents and the housing remaining relatively stationary.

If desired, the invention may be constructed in such a way it "floats" underwater with the impeller above and the housing beneath. This is accomplished by so fabricating the housing that it has a greater specific gravity than the average specific gravity of the impeller and of so much of the shaft as extends outside the housing. A unit made in this fashion should be connected to its anchor line by ring assembly 12 rather than by 13. Then, the stabilizing means can be dispensed with. It should be apparent also, that in an embodiment of this type it might be found desirable or necessary to invert some of the parts in the housing.

Because the driving sleeve 22 is fixedly secured to the upper impeller disc 41, rotation of the impeller causes the sleeve 22 to rotate about the shaft 8. Such rotation is usable as a source of mechanical energy to power the alternator parts within the housing. Thus, the sleeve 22 functions as the first element in a power train connecting the impeller outside the housing to the alternator elements within. The power train will now be described.

The sleeve 22 is an integral part of a large gear 24, located within the generator compartment 7. This gear is referred to as the impeller gear. Adjacent one side of the impeller gear is a vertically disposed, rotatable rotor shaft 29, journalled in bearings 27 and 28 seated in bosses 25 and 26 provided in the bottom and cover of the housing, respectively. A rotor pinion 30 is fixed on the shaft 29 in position to mesh with impeller gear 24. A rotor disc 31, having a central opening provided with internal teeth complementary to the teeth on pinion 30 is also provided. The disc is mounted on the pinion as shown in FIGURES 1 and 2. The complementary teeth on the pinion and in the central aperture of the disc 31 intermesh, so that the rotor and rotor shaft cannot rotate relative to one another. They can and do rotate together when the shaft 29 turns. Thus, the pinion serves as a driving connection between the rotor and rotor shaft.

In this embodiment of the invention, the rotor disc 31 carries field magnets 59, arranged in side to side relationship about its periphery. It should be understood that FIGURES 1 and 2 illustrate the magnets schematically. In FIGURE 2, only a few magnets have been shown on the disc 31, whereas, in the usual case, the magnets are placed about the entire periphery of the disc. The magnets appear in greater detail in FIGURE 7, which relates to a rotor that differs from the one shown in FIGURES 1 and 2 in matters other than the appearance and placement of the magnets. Among the preferred materials for the rotor are hardenable plastics, including polyester and polyepoxy resins. With the aid of these materials the rotor and magnets can be cast in a rigid unitary assembly using potting techniques familiar to those skilled in the electrical arts.

In this embodiment of the invention, there is a stator ring 32, supported at one quarter by a notch 33 in side wall 2, as shown in FIGURE 1. It is supported at the two adjacent quarters by ears 34 and 35 which extend inward from the walls 36 and 37, respectively, which divide the generator compartment from the two payload compartments. At the remaining quarter, the stator ring 32 is notched to clear the fixed shaft 8.

The stator ring has an inner diameter which is only slightly greater than the diameter of the rotor. The difference has been exaggerated in FIGURES 1 and 2 for the sake of clarity. Situated about the ring 32 are windings 10, schematically illustrated in FIGURE 2. As in the case of the magnets on the rotor, the windings usually are placed about the entire ring and not about part of it as shown. The windings may take many different forms and their exact structure constitutes no part of the present invention. One skilled in the art would readily suggest several alternative types of windings which would operate successfully. I prefer, however, to employ bifilar windings, wound about poles in the shape of short rods of a diameter slightly larger than that of the wire used in winding them. Each pole has a bent or enlarged head which is flattened in a plane perpendicular to the longitudinal axis of the pole, the head serving as a pole shoe. With the aid of materials and techniques previously mentioned in connection with fabrication of the rotor, a unitary stator ring can be made in which vertical stacks of several poles each are oriented radially in the ring at uniform angular intervals, the pole shoes being located at the inner surface of the ring, so as to face the rotor magnets, and the remaining portions of the poles and windings being embedded in the body of the ring.

It should be understood that the windings could be placed in the rotor and the magnets in the stator, if desired. This is not ordinarily convenient, however, unless the device powered by the alternator is situated on the rotor or some part which rotates with it. Therefore, the arrangement described above is the preferred one.

It should also be understood that the terms "rotor" and "stator" as used in this specification and in the claims are not to be regarded as limited to a disc-shaped rotor and ring-shaped stator. Many other shapes of stator and rotor are possible and are contemplated. By way of illustration and not limitation, it might be mentioned that the stator and rotor can be first and second discs of equal diameter having corresponding circular, planar surfaces in which the ends of the magnet and the pole shoes, respectively, are arranged in similar radial patterns. These discs will be mounted in face to face relationship, one of them being fixed to some support, the other being attached to any suitable means for causing it to rotate in close proximity to the other.

The rotor 31 has a generating position in which it appears in FIGURE 1 and a starting position indicated by dotted lines in the same figure. It will be recalled that the rotor is mounted on the shaft with the aid of a pinion 30, the rotor having a center hole provided with teeth complementing and matching those on the pinion. Thus, although the pinion constitutes a driving connection between the shaft and rotor, it also permits a degree of axial, up and down movement by the rotor with respect to the shaft. The rotor may be prevented from escaping the space between and including the aforesaid positions by any suitable kind of stop (not shown). For instance, a pair of set screws may be fitted into one of the grooves between the teeth on pinion 30 the set screws being threaded into a pair of spaced apart holes in the bottom of the aforesaid groove. One hole would be located at the extreme upper end of the groove; the other should be located just below the dotted outline of the lower position depicted in FIGURE 1. The set screws should be long enough to protrude into the groove so as to limit the movement of one of the internal teeth on the rotor disc 31. Many other kinds of stops will readily be substituted by one skilled in the art and the stops, per se, constitute no part of the present invention.

An essential element of this invention is a means for shifting the rotor axially along the shaft from the starting position to the generating position whenever the rotor shaft attains a predetermined rotational velocity. The essentiality of this element results from the fact that in the present invention, cogging effects are avoided by constructing the rotor in such a manner that it seeks and maintains a position displaced axially from the plane of the stator and the generating position whenever the rotor is still or rotating at such a slow velocity that cogging becomes a problem. Hence the need for a means for shifting the rotor to generating position when the rotor has sufficient rotational velocity to overcome or avoid cogging problems. While the invention is not limited to utilizing any particular means for producing the desired result, certain means are preferred and will now be described.

A first embodiment of means for shifting the rotor is disclosed in FIGURES 3–5. These figures show a rotor 31, rotor shaft 29 and rotor pinion 30 that are interchangeable with the ones in FIGURES 1 and 2 insofar as their relation to the stator, power train, housing and impeller are concerned. Only the rotor differs structurally from the one in FIGURES 1 and 2. In this embodiment the generator compartment is filled with any suitable liquid, preferably an oil. Transformer oil has been found to be quite satisfactory. To allow for expansion and contraction of the oil, a bellows 38 is secured to wall 2 over a hole 39, through which sea water may gain access to the interior of the bellows. See FIGURES 1 and 2.

During its fabrication, the rotor is given a specific gravity that is greater than that of oil, so that it will have a slightly negative buoyancy with respect to the oil. This can readily be accomplished by a judicious choice of materials for the main portion of the disc. Making the necessary choice of materials is well within the skill of the art. However, for the sake of completeness, it might be mentioned that consideration should be given to the use of inert fillers for increasing specific gravity and to the provision of closed voids within the body of the disc for decreasing specific gravity.

Because of its negative buoyancy, the rotor disc 31 tends to seek the level illustrated in FIGURE 4, where it is supported by any suitable kind of stop member, such as a set screw in one of the grooves of pinion 30, as previously described. This position corresponds with the position indicated by the dotted lines in FIGURE 1, referred to herein as the starting position.

On the underside of the rotor of FIGURES 3–5 are a plurality of radially disposed vanes 40. They may be formed as integral parts of the rotor in a unitary molded assembly, or they may be fabricated separately and attached to the rotor with any kind of securing means. In this embodiment they are integral parts of the rotor. The vanes 40 are pitched, their trailing edges being spaced downwardly from the underside of the rotor. As the rotor is turned in its normal direction of rotation (being clockwise when viewed from beneath, as in FIGURE 5) the reaction of the vanes against the oil tends to force the rotor disc upwards from the starting position to the generating position.

From the description of the cogging problem given at the outset, it will be apparent that with every underwater generator in which there is an alternator with a rotor fixed in generating position, there will be a range of current velocities within which the current velocity would be sufficient to sustain the rotation of the rotor, if it happened to be rotating at that moment, but would be insufficient to overcome the cogging effect and start the rotor if it then happened to be standing still. This range of current velocities is hereinafter referred to as the "critical current velocity range." In the present embodiment of the invention, the size and pitch of the impeller blades, the mechanical advantage of the power train, the amount of friction in the system, the mass of the rotor, the density and viscosity of the oil and the size, pitch, number and radial position of the vanes 40 are fixed by routine experiments at values which cause the rotor to drop from generating position to starting position whenever the water current velocity drops out of the critical range and cause the rotor to move from starting position to generating position whenever the water current velocity attains at least the minimum value in the critical current velocity range.

When the rotor disc is in the starting position, it is displaced axially from the stator, so that cogging cannot occur. The rotor and stator are separated by sufficient space so that the magnetic attraction between them is reduced to the point that the cogging effect is largely eliminated. Thus, the rotor may be started from standstill or operated at a low rotational velocity without experiencing cogging effects.

When an alternator containing underwater generator not equipped in accordance with this invention is first dropped into the water and assumes its operating position, it will not begin to operate unless the current velocity at some time exceeds the maximum velocity in the critical velocity range. If the prevailing current conditions in the vicinity happen to fall within the critical range, the generator will lie "dead" in the water, producing no current at all. Even if the generator were started by a temporary surge in water current velocity, as soon as the current dipped below the low end of the critical velocity range, the generator would be immediately rendered inoperative until another surge occurred. This problem is largely eliminated by the present invention in that attainment of the maximum velocity in the critical velocity range is not prerequisite to the starting of the rotor.

Another rotor embodiment is disclosed in FIGURES 6–8. It accomplishes the same results as the embodiment of FIGURES 3–5, but with somewhat different means. The rotor: is mounted on shaft 29 by means of spline 30; is driven by impeller gear 24; has a starting position (indicated by dotted lines) and a generating position (in which it is shown in FIGURE 7); has magnets 59 about its periphery; and fits into the generator compartment in the same manner as shown in FIGURES 1 and 2. Unlike the rotors shown in FIGURES 1–5, the rotor 31 of FIGURES 7 and 8 is provided with radially disposed, guides in the form of rectangular compartments 55 and 56, each of which contains a flyweight, only one of the weights being visible. Weight 49, and its companion weight in compartment 56, are each provided with hollowed out portion 53, across which are secured pins 51 and 52. The weights and compartments have dimensions which permit radial movement of the weights within the slots. The weights are connected to pivotable hangers 47 and 48 which are made of thin spring steel or equivalent material, the outer ends of the hangers being attached to the pins 51 and 52. The hangers pass out of the compartments 55 and 56 through slots 57 and 58 provided in the upper surface of the rotor. The inner ends of the hangers are secured to pins 45 and 46 fixed transversely in radial slots 43 and 44 in slotted circular collar 42, fixedly secured to shaft 29.

In operation, this rotor operates somewhat like the familiar governor. As the rotational velocity of the rotor increases, the weights exert increasing amounts of radially outward tension on the hangers, raising the rotor. When the rotor is stopped, the parts will occupy the starting position indicated in dotted lines. The size and pitch of the impeller blades, the mechanical advantage of the power train, the amount of friction in the system, the mass of the rotor and weights, the length and position of the hangers and their points of attachment to the shaft and the weights will be fixed so as to produce the same relaitonship between the critical current velocity range and the rotor position that was discussed in connection with the previous embodiment.

This embodiment can be operated with or without oil in the generator compartment. The streamlined outline of the collar 42 and the thin cross-section of the hangers lend themselves well to operation in oil, resulting in a minimum of drag. If oil is used the density of the oil and the specific gravity of the rotor will have an effect on the operation of the rotor and must be taken into consideration.

In still another embodiment of the invention, the rotor intermittently serves diverse functions. It is frequently desirable to take periodic measurements of sub-surface water current velocities over long periods of time. Underwater generators of the type described herein are admirably suited for adaptation to taking such measurements. When the rotor of a generator of the type disclosed in FIGURES 1–8 is rotating under power derived from water currents which drive the impeller blades, the rotational velocity of the rotor is a simple function of the water current velocity, provided there are no extraneous forces exerted on the rotor. By "extraneous forces" is meant counter-torque on the rotor resulting from an electrical load on the generator and cogging effects.

Clearly, there will be a counter-torque on the rotor whenever the generator is under an electrical load, and that torque will fluctuate with changes in the load. Also, it is apparent that cogging effects can prevent an alternator rotor from turning slowly or evenly enough to accurately log very slow currents. The present embodiment avoids the effects of these extraneous forces by providing means for maintaining the rotor in generating position whenever the current velocity exceeds the minimum value in the critical current velocity range and for periodically taking it out of generate position for an interval of time, when necessary, during which interval an accurate current velocity measurement can be taken—the rotor then being free of extraneous forces.

The above functions can be performed by a variety of apparatus. A preferred embodiment includes a housing of somewhat larger size than depicted in FIGURES 1 and 2. The impeller, the fixed shaft, the mode of joining the impeller to impeller gear 24, and the mode of fixing shaft 8 in the housing are unchanged, however. This embodiment includes a rotor shaft 29, rotor disc 31, rotor pinion 30 and means for shifting the rotor axially on the shaft as disclosed in FIGURES 6–8. The present embodiment, however, introduces a new movement—shifting the rotor shaft.

It will be noted that in FIGURE 9, the end 64 of rotor shaft 29 is situated well above the bottom 3 of housing 1. The housing is higher than the shaft is long. The bearings 27 and 28, fixed to the bottom and top of the housing, are sleeve bearings in which the shaft 29 is free to rotate and to reciprocate axially. As disclosed in FIGURE 9, however, the shaft is biased upwardly by a coil spring 84 situated around the shaft between the top of lower bearing 27 and the bottom of the rotor pinion 30. As long as the shaft remains in this position, this embodiment operates in the same manner as the one shown in FIGURES 6–8. The rotor, suspended on shaft 29 by hangers 47 and 48 and collar 42, remains in generate position whenever there is sufficient water current velocity, inducing current in the stator 32. When the water current velocity drops below the critical range, the rotor drops out of generate position to a position well below the stator, its downward travel being limited by a thrust bearing 79, mounted just above gear 24 on a cylindrical support 80, surrounding bearing 27 and slotted to avoid interference with the gear.

Adjacent the rotor starting position is a water current measuring coil 81, mounted upon support 82. Whenever the rotor is rotating in starting position, this coil can generate signals indicative of its rate of rotation. When the water current velocity is below the critical range, the rotor will always be adjacent the coil. However, when the water current velocity is within or above the critical range, the fly-weights in the rotor will hold it at the top of the pinion 30. Under such circumstances, the rotor may be periodically moved into current measuring position adjacent coil 81 by shifting the shaft 29 downwards.

A thrust collar 68 is fixed on shaft 29 with the aid of a key 78. Abutting the collar is a cam drive gear 67 and integral first rotary cam means 65 which are both capable of rotational movement with respect to shaft 29. There is a cooperating second cam means affixed to housing cover 4. The cam 65 is an annular ring formed on the top of gear 67 and concentric therewith. The aforesaid ring contains a depression 85. The cam 66 is also an annular ring which is concentric with gear 67, is the same diameter as cam 65, and has a hump 86 whose height equals the depth of the depression in cam 65. The hump is not as wide however as the depression 85.

Figure 11:
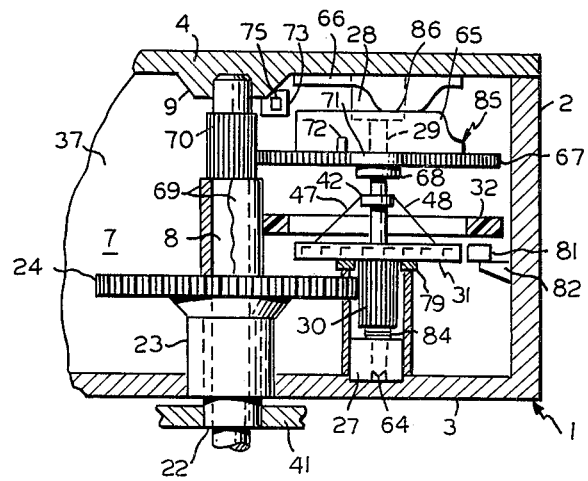
FIGURE 11 is similar to FIGURE 9 but shows some parts in alternate positions.

The cams and gear are shown in normal position in FIGURE 9, and are normally stationary. When the cam 65 is rotated to the right, the hump 86 will travel for a time in the bottom of the depression. Finally, however, continued rotation of the cam 65 will of necessity force it downward, forcing the shaft and rotor downward and compressing the spring 84 as shown in FIGURE 11. The means for rotating the cam will now be described.

Figure 10:
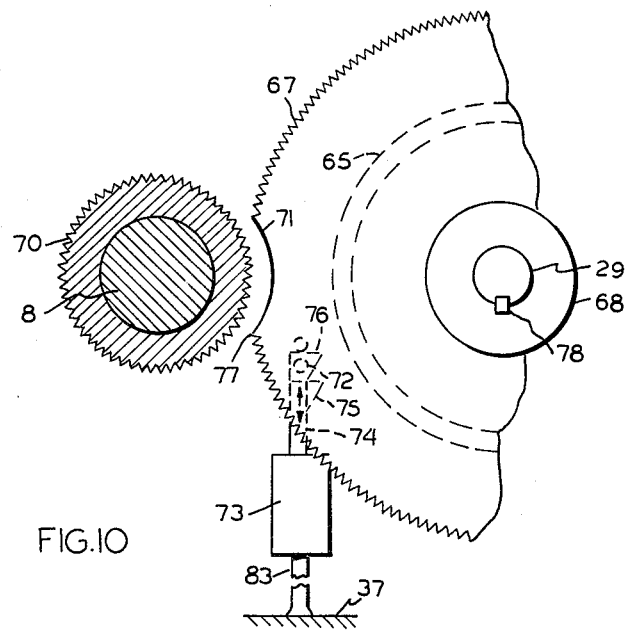
FIGURE 10 is a sectional view taken along section line 10 in FIGURE 9.

As shown in FIGURE 10, the gear 67, to which the cam 65 is connected, has a portion 71 from which the teeth have been removed. When the gear 67 and cam 65 are in normal, stationary position, this toothless portion 71 faces a cam gear drive pinion 70 which is mounted on stationary shaft 8 and is free to rotate thereon. The pinion 70 is fixedly connected to impeller gear 24 by a driving sleeve 69, also rotatably mounted on shaft 8.

A solenoid 73 is used to engage the gear 67 with its driving pinion 70. Adjacent the toothless portion of the gear on its upper surface is secured an upright pin 72. The solenoid 73 is supported on wall 37 of the payload compartment by a bracket 83. Its armature 74 is fitted with an anvil 75 that is positioned adjacent the pin. When the solenoid is energized, the anvil moves to its extended position 76, pushing the pin ahead of it and, as a result, causing the gear 67 to rotate until its first few teeth 77 engage the pinion 70. Then the pinion drives the gear 67 through single complete revolution, shifting the shaft 69 downward as a result and allowing the shaft to return to its normal position under the influence of spring 84 at the conclusion of the revolution.

Figure 12:
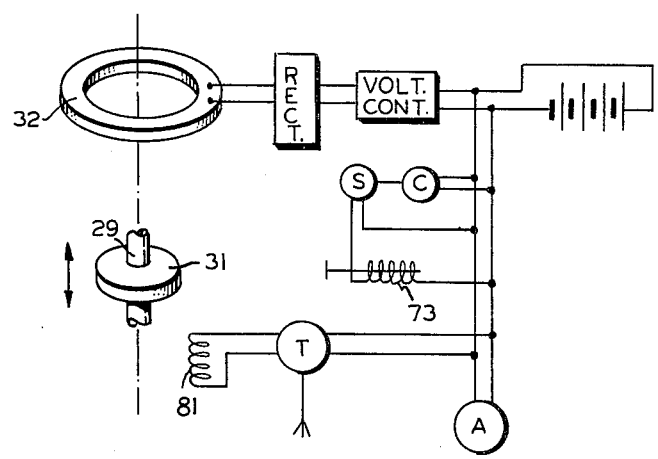
FIGURE 12 is a schematic diagram of a circuit containing the alternator of the present invention associated with various items of auxiliary equipment.

The alternator stator 32, current measuring coil 81 and solenoid 73 may all be included in an automatic power supply and data transmitting circuit, of which FIGURE 12 is an example. The alternator stator 32 is connected in parallel to a rectifier, a voltage control and battery. The generator is able to charge the battery when it is generating and the battery is also to substitute for the generator during those periods when the latter is inoperative, such as while a current velocity measurement is being taken. Also connected in parallel to the generator is a clock C which closes a switch S periodically. The solenoid is connected in parallel with the generator, one leg of the solenoid circuit being connected in series with the switch. Thus the solenoid will be energized and the rotor 31 will be shifted downward to a position opposite measuring coil 81 each time the switch S closes, provided, of course, that the rotor was not already in that position because of low water current velocity. The coil 81 is connected to the input of a transmitter T which is also connected in parallel with the generator. The transmitter produces an output signal indicative of water current velocity and transmits it via an antenna to a remote recording station (not shown). Any desired auxiliary device A may also be included in this circuit.

Having described specific embodiments of my novel apparatus, I wish it understood that the various details of construction and operation given herein are given by way of illustration only and that they should not be construed as unnecessarily limiting the appended claims which are intended to encompass the full scope of my invention.

What I desire to protect by United States Letter Patent is:

1. An alternator including: a housing; a stator in said housing, including windings; a shaft journaled in the housing; a field magnet carrying rotor associated with the shaft; means for connecting the rotor to the shaft and for preventing relative rotational movement between them while permitting a degree of axial movement of the rotor along the shaft; said rotor having a generating position on said shaft in which said rotor is adjacent said stator for generation of current upon rotation of said shaft and a starting position in which said rotor is axially displaced in a direction away from said stator and said generating position; means for shifting the rotor axially along the shaft from the starting position to the generating position whenever the shaft attains sufficient rotational velocity to overcome cogging effects.

2. An alternator according to claim 1 wherein: the shaft is submerged in a liquid contained in the housing, the rotor being normally maintained in the starting position by a difference between its specific gravity and that of the liquid; and the means for shifting the rotor being a plurality of vanes associated with the rotor.

3. An alternator according to claim 1 wherein the means for shifting the rotor includes: a plurality of radially reciprocable fly-weights secured to the rotor by radially disposed guides, and pivotable, radially disposed hanger means secured to the weights and to the shaft.

4. An alternator including: a housing; a shaft journaled in the housing; a field magnet carrying rotor associated with the shaft; means for connecting the rotor to the shaft and for preventing relative rotational movement between them while permitting a degree of axial movement of the rotor along the shaft from a starting position to a generating position; a stator, including windings, located in the housing about the shaft adjacent the generating position; means for shifting the rotor axially along the shaft from the starting position to the generating position whenever the shaft attains a predetermined rotational velocity; and automatic means for periodically shifting the shaft in the direction of said starting position.

5. An alternator according to claim 4 wherein a water velocity measuring coil is mounted in the housing adjacent the starting position.

6. An alternator according to claim 4 wherein the means for shifting the shaft includes a normally stationary first rotary cam means on one end of said shaft; a thrust collar on said shaft abutting said first cam means and preventing axial displacement of said first cam means axially along said shaft while allowing independent rotation of the shaft and first cam means; a second rotary cam means complementary to the first rotary cam means and fixed in said housing; and means for causing said first rotary cam means to revolve periodically.

7. An alternator according to claim 6 wherein the shaft is provided with spring means for assisting in returning the shaft to normal position at the conclusion of each operation of the cam means.

References Cited by the Examiner
UNITED STATES PATENTS

| | | | |
|---|---|---|---|
| 452,795 | 5/91 | Kinter | 310—157 |
| 868,798 | 10/07 | McLaughlin | 290—54 |
| 1,079,008 | 11/13 | Inrig | 310—209 |
| 1,557,213 | 10/25 | Lee | 310—209 |
| 1,669,055 | 5/28 | Hogg | 290—54 |
| 1,763,104 | 6/30 | Shuntleff | 310—209 |
| 1,935,005 | 11/33 | Ash et al. | 310—209 |
| 1,947,018 | 2/34 | Plastino | 290—53 |
| 2,492,810 | 12/49 | McDermott | 310—209 |
| 3,064,137 | 11/62 | Corbett et al. | 290—54 |

ORIS L. RADER, *Primary Examiner.*